FREQUENCY-(OR PHASE)-MODULATION INTERMEDIATE-FREQUENCY COMBINING RECEPTION SYSTEM

Filed May 10, 1961 3 Sheets-Sheet 1

Inventor
M.Miyagi
By [signature]
Attorney

Inventor
M.Miyagi
By [signature]
Attorney

June 1, 1965 MASAHISA MIYAGI 3,187,257

FREQUENCY-(OR PHASE)-MODULATION INTERMEDIATE-FREQUENCY COMBINING RECEPTION SYSTEM

Filed May 10, 1961 3 Sheets-Sheet 3

Inventor
M. Miyagi

By R P Morris
Attorney 3,187,257

FREQUENCY-(OR PHASE)-MODULATION INTERMEDIATE-FREQUENCY COMBINING RECEPTION SYSTEM

Masahisa Miyagi, Tokyo, Japan, assignor to Nippon Electric Company, Limited, Tokyo, Japan, a corporation of Japan Filed May 10, 1961, Ser. No. 109,043
Claims priority, application Japan, May 16, 1960, 35/24,673
7 Claims. (Cl. 325—305)

The present invention relates to an intermediate-frequency combining system for frequency-(or phase)-modulation combining reception which is often used in the over-the-horizon communication or the like. For convenience of reference the term angle modulation will be used to denote either frequency or phase modulation. As is well known, diversity reception is often used to improve deteriorated signal characteristics which result from fading.

Among the various combining systems is the intermediate-frequency combining system used conventionally. In order to obtain sufficiently favorable operational characteristics with this system the allowable order of diversity reception must be restricted (dual, quadruple, octuple, and so forth). Further, the higher the order, the more complex the adjustment becomes and the more frequently degradation in the operational characteristics accompanying the adjustment occurs. Where two receiving signals are combined in stages using hybrid circuits, the operation of the phase detection circuit is liable to malfunction, accompanying variations in amplitude of the received signal wave.

An object of the present invention is to provide a system simpler in construction and easier in adjustment than conventional systems whereby the automatic phase control circuit operates independently for each receiving unit.

Another object of the present invention is to provide facilities for preventing degradation in characteristics of the received combined signal wave by eliminating automatically a detrimental signal output that occurs when the automatic phase control malfunctions.

Still another object of the present invention is to obtain a frequency-(or phase)-modulation intermediate-frequency combining reception system of favorable characteristics and ease of adjustment which is not subject to limitations as to the order of diversity reception.

The present invention is an angle-modulation intermediate-frequency combining reception system, for frequency-(or phase)-modulation receiving equipment, and comprises two or more sets of receiving units characterized by: means for supplying the intermediate-frequency reception signal wave of each receiving unit and the overall combined reception signal wave obtained by the parallel connection of the intermediate-frequency signal waves to separate phase detection circuits so as to detect the phase difference between the overall combined reception signal wave and each of the intermediate-frequency signal waves; means for applying the detected output to local oscillators each of which is frequency-modulated in response to the output signal of the phase detector in the corresponding receiving unit so as to perform automatic phase control of each receiving unit; and automatic facilities for detecting a strong beat frequency, between the intermediate-frequency signal waves, for a receiving unit in which the automatic phase control has malfunctioned and for eliminating the faulty reception signal output which is not automatically phase controlled so as to prevent the output from participating in the overall combined reception signal and, at the same time, so as to restore the automatic phase control action of the faulty receiving unit.

The particular embodiment of the invention is made with reference to frequency modulated wave reception. It will be clear that the system will also work with phase modulated waves.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
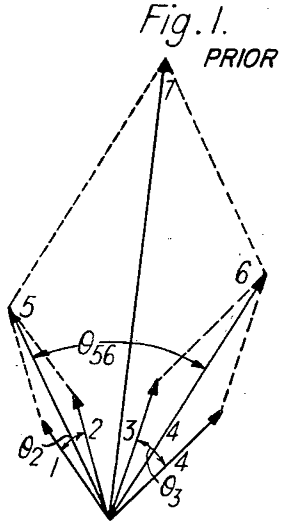
Fig. 1. PRIOR ART
FIG. 1 is a vector diagram illustrating the principle of the conventional frequency-modulated intermediate-frequency combining reception system.

FIG. 1 is a vector diagram illustrating the principle of quadruple diversity reception as conventionally performed in frequency-modulation intermediate-frequency combining reception systems. 1, 2, 3, and 4 denote the I.-F. signal waves of four receivers; 5 a resultant vector of the I.-F. signal wave vectors 1 and 2; 6 a resultant vector of the I.-F. signal wave vectors 3 and 4; and 7 an overall resultant reception signal wave vector of the I.-F. combined signal wave vectors 5 and 6.

Let the phase angles between two vectors 1 and 2, 3 and 4, and 5 and 6 be $\theta_{12}$, $\theta_{34}$, and $\theta_{56}$, respectively. According to the conventional frequency-modulation I.-F. combining reception system the phase angles $\theta_{12}$ and $\theta_{34}$ are respectively detected by two phase detectors and to these phase detectors an output which has detected the phase angle $\theta_{56}$ is connected in cascade to obtain an output for performing automatic phase control of each receiving unit while as to the I.-F. signal waves two I.-F. signal waves of each two receivers are combined and then two I.-F. resultant signal waves are recombined so as to obtain the overall I.-F. reception signal wave.

Figure 3:
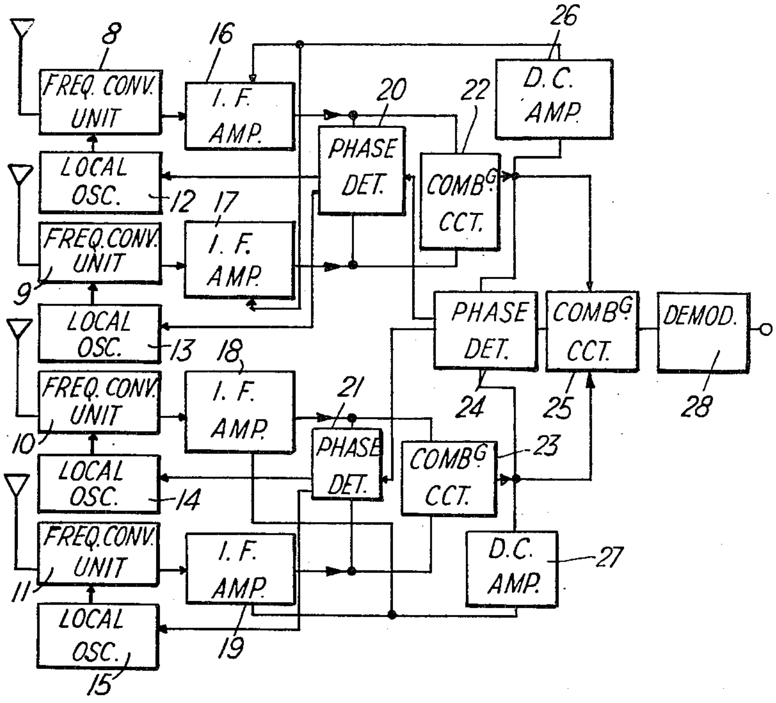
Fig. 3. PRIOR ART
FIG. 3 illustrates in schematic block form the principle of the conventional frequency-modulation intermediate-frequency combining reception system.

FIG. 3 illustrates in block form an FM I.-F. combining reception system conventionally used for quadruple diversity reception.

Referring now to FIG. 3, 8, 9, 10, 11 denote the frequency conversion units of four receiving units; 12, 13, 14, 15 are receiving local oscillators in these receiving units, each containing a frequency varying element for performing automatic phase control; 16, 17, 18, 19 are I.-F. amplifier units in these receiving units; while 20 and 21 denote phase detection circuits each for detecting the phase angle between two receiving units. 22 and 23 are hybrid circuits each for combining the I.-F. signals of two receiving units; 24 denotes a phase-detection circuit for detecting the phase difference between the two sets of the combined I.-F. signal waves; 25 is a hybrid circuit for further combining the two sets of the I.-F. combined signal waves; 26 and 27 are D.-C. amplifiers for automatic gain control; and 28 denotes a demodulator unit for the FM wave.

The phase angle $\theta_{12}$ in FIG. 1 is detected by the phase detector circuit 20 and the detected output is applied to each of the receiving local oscillators 12 and 13 as an automatic phase control voltage. In a similar manner, the phase angle $\theta_{34}$ is detected by the phase detection circuit 21 for application to each of the receiving local oscillators 14 and 15. The composition of the two I.-F. signal waves is performed in each of the hybrid circuits 22 and 23 to obtain the I.-F. combined signal waves 5 and 6 shown in FIG. 1. In a similar manner, the I.-F. combined signal waves 5 and 6 are recombined by the hybrid circuit 25 to obtain the overall combined reception signal wave, while the phase angle $\theta_{56}$ between the I.-F. combined signal waves 5 and 6 is detected by the phase detection circuit 24 for superposition on each of the outputs of the phase detectors 20 and 21 as an automatic phase control voltage.

The automatic gain control circuit is provided with the detector 24, which may be followed by a D.C. amplifier if necessary, on the output side of the hybrid circuits 22 and 23. Where required, the detected output is amplified by the D.-C. amplifiers 26 and 27 before application to each of the I.-F. amplifier units 16, 17, 18, and 19. The overall combined reception signal wave thus obtained is applied to the demodulator unit 28 for the FM wave.

As will be evident from the vector diagram of FIG. 1, with the conventional system, in which two sets of the I.-F. signal waves are arranged in two stages, beating will be produced in the overall combined reception signal wave when the automatic phase control circuit of any one receiving unit malfunctions excessively deteriorating its performance. In the case of octuple diversity reception, an additional four receiving units and combination circuits as shown in FIG. 3 are needed as are hybrid circuits for the combination as well as phase detectors for detecting the phase angles between them, with the result that the construction of the automatic phase control circuit becomes much more complex.

Figure 2:
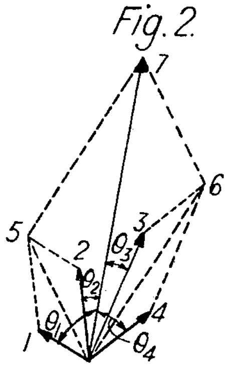
FIG. 2 is a vector diagram illustrating the principle of the present invention.

FIG. 2 is a vector diagram illustrating the principle of operation for an embodiment of the FM I.-F. combining reception system according to the present invention (for a case of quadruple diversity). As will be evident from the diagram, the I.-F. signal waves of four receiving sets are combined only once (by parallel connection) to become the overall combined reception signal wave 7.

Let the phase angles between vectors 1 and 7, 2 and 7, 3 and 7, 4 and 7 be denoted by $\theta_1$, $\theta_2$, $\theta_3$, and $\theta_4$, respectively. Then, automatic phase control for each received signal wave is performed by applying the outputs obtained through detection of the phase angles $\theta_1$, $\theta_2$, $\theta_3$, and $\theta_4$, by the individual phase detection circuits, to the local oscillators in the corresponding receiving units.

Figure 4:
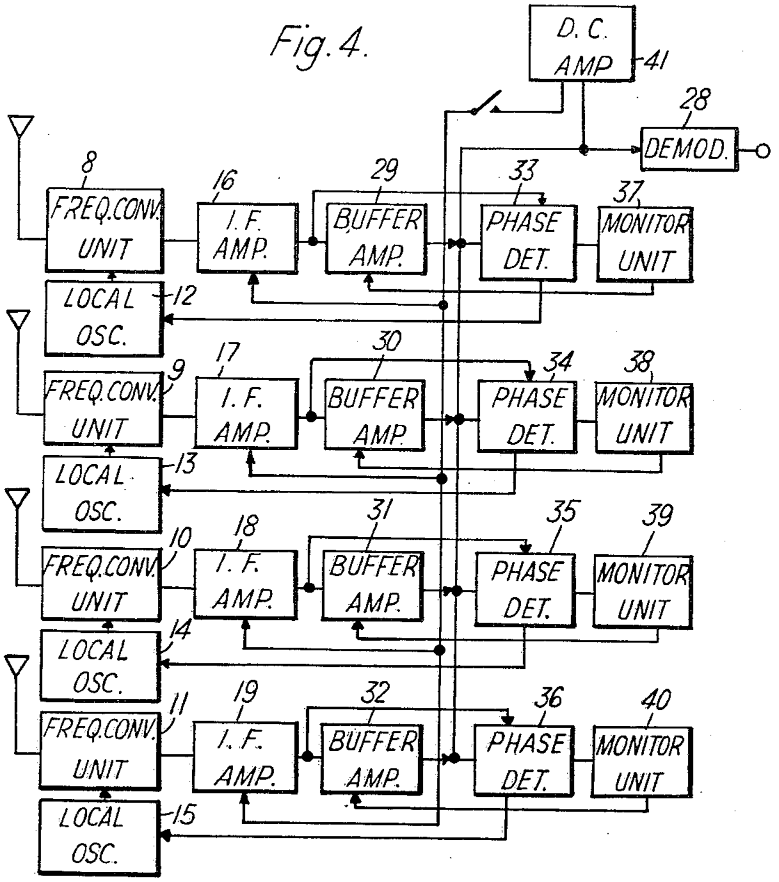
FIG. 4 shows a schematic block diagram illustrating the principle of the frequency-modulation intermediate-frequency combining reception system of the present invention.

FIG. 4 shows a schematic block diagram illustrating the principle of operation of quadruple diversity for the embodiment of frequency-modulation intermediate-frequency combined reception system according to the present invention. Referring to this figure, the same numerals as in FIG. 3 are used for parts 8 through 19 and 28. 29 through 32 are buffer amplifiers for performing parallel connection, while 33 through 36 denote phase detectors for detecting the phase angle between the overall combined reception signal wave and the I.-F. signal wave of each receiving unit; the detected outputs being applied as automatic phase control voltages to the receiving local oscillators in the corresponding receiving units. 37 through 40 are monitor amplifier units for monitoring the operation of the automatic phase control circuits, each comprising detector circuit and a relay circuit, while 41 is a D.-C. amplifier for automatic gain control.

The phase angle $\theta_1$ in FIG. 2 is detected by the phase detector 33 and the detected output is applied as an automatic phase control voltage to the receiving local oscillator 12. In a similar manner, the phase angle $\theta_2$ in FIG. 2 is detected by the phase detector 34 and the detected output is applied to the receiving local oscillator 13. Inasmuch as the automatic phase control circuits in receiving units are not connected in cascade as in case of FIG. 3, these circuits can be controlled individually. Thus, the overall combined reception signal wave is obtained by connecting the anodes of the buffer amplifier 29, 30, 31 and 32 in common for parallel connection.

The monitor amplifiers 37, 38, 39 and 40 operate such that a received signal wave output may be automatically disconnected for a receiving unit in which automatic phase control has malfunctioned. This is necessary to insure that a received signal wave, not automatically phase controlled, is not applied as a part of the overall combined reception signal wave. Their functions are to detect from a part of the phase detector a strong beat frequency produced between the received signal waves for discriminating a faulty receiving unit, and to eliminate the I.-F. signal wave of the faulty receiving unit from the overall combined reception signal wave by changing the operating point of the associated buffer amplifier by means of a relay contained in the associated monitor amplifier so that the faulty reception signal wave may be automatically eliminated. By providing a relay for each buffer amplifier, both a trouble in the automatic phase control circuit in each receiving unit and a trouble in each buffer amplifier can be detected.

If a search is made by interrupting the I.-F. signal wave of a faulty receiving unit and applying an A.-C. signal to the receiving local oscillator, for example (12), to provide frequency deviation so that automatic phase control may operate with respect to the input signal wave, the operation of the buffer amplifier is restored by means of the relay contained in the monitor amplifier 37 so that the I.-F. signal wave is automatically added to the overall combined reception signal wave and hence, normal operation is restored. Where the automatic phase control circuits of more than two receiving units are inoperative, such as in case of starting, a priority sequence can be assigned and the I.-F. signal wave 1 is used in lieu of the overall composed reception signal wave, so that automatic phase control of each receiving unit may be provided with the phase difference therewith. For example, suppose that automatic phase control is applied to the I.-F. signal wave 2. Then, the resultant I.-F. signal which is the composition of the I.-F. signal waves 1 and 2 takes the place of the overall combined reception signal wave by the operation of buffer amplifier 30. In a similar manner, connections will be made one by one, in succession, from the receiving unit in which the automatic phase control has operated normally and a search due to frequency deviation of the receiving local oscillator continued until phase lock is accomplished. Automatic gain control may be provided for the overall combined reception signal wave by the D.-C. amplifier 41 by applying an automatic gain control voltage in common to all the I.-F. amplifiers 16, 17, 18 and 19 when required.

The frequency-modulation intermediate-frequency combined signal wave thus obtained is applied to the frequency-modulation signal demodulator unit 28 to obtain a demodulated signal wave.

Features of the frequency-(or phase)-modulation intermediate-frequency combining reception system according to the present invention are summarized as follows:

(1) With the conventional system, the composition of an arbitrary number of receiving signals was difficult, whereas with the present system diversity of any arbitrary order is possible.

(2) Use is made of buffer amplifiers. This eliminates the detrimental effect of reflection due to parallel connection, and further, serves to switch off faulty receiving units. A trouble in any buffer amplifier can easily be detected by a relay. Since the buffer amplifiers are connected in parallel, trouble in any amplifier can easily be detected by a relay. Since the buffer amplifiers are connected in parallel, trouble in any amplifier causes the output of the corresponding receiving unit only to malfunction, and therefore, the overall operation does not materially suffer.

(3) It is possible to operate the present system after disconnecting a faulty receiving unit in which automatic phase control has malfunctioned. Where the system is operated on octuple diversity basis, it is practical to operate on a septuple diversity basis, when one receiving unit malfunctions, whereas with conventional systems, it would be necessary to reduce to quadruple diversity operation. It will be evident that septuple diversity is superior in performance to quadruple diversity.

(4) With the aid of the monitor amplifier unit, an improper I.-F. reception signal wave may be separated from the combined reception signal wave, and the combned reception continued free from trouble.

(5) Automatic phase control is provided for each receiving unit independently, facilitating the adjustment of each operating point. Further, the automatic phase control voltage is applied to each receiving unit independently. This enables the faulty I.-F. reception signal wave to be eliminated from the combining circuit, when an automatic phase control malfunctions and at the same time, search facilities due to frequency deviation to become possible, whereby restoring action can be secured.

(6) Automatic gain control is applied to receiving units in common. Because of this, ease of adjustment and favourable operating characteristics are combined.

It will be understood that various changes in the details and arrangements of parts which have herein been described and illustrated in order to explain one embodiment of the invention may be made by those skilled in the art within the principle and scope of the invention, as expressed in the appended claims.

What I claim is:

1. In an angle modulation intermediate-frequency combining reception system, the combination comprising:
(a) a radio frequency signal source;
(b) at least two receiving channels connected in parallel and including means for combining the outputs of said channels, each channel including:
(b–1) a signal input terminal for receiving the R.-F. signals and an output terminal;
(b–2) a frequency converter stage and a local oscillator connected to control said stage, for converting the R.-F. signals to I.-F. signals;
(b–3) an I.-F. amplifier connected to receive and amplify said I.-F. signals;
(b–4) buffer interrupting means connected between said I.-F. amplifier and said output terminal for selectively interrupting the transmission of the I.-F. signals through said channel;
(b–5) a phase detector connected to receive and compare the signals from the I.-F. amplifier with the combined channel output signals and producing detector output signals in response to said comparison which are connected to automatically control the phase of said local oscillator;
(b–6) monitoring means connected to said phase detector for monitoring the signals being generated in said channel and producing monitor output signals whenever predetermined undesired signals are sensed in the channel, said monitor output signals being supplied to control said buffer interrupting means to interrupt transmission of said undesired signals through the channel;
(c) a demodulator connected to demodulate the combined channel output signals;
(d) and gain control signal means responsive to said combined channel output signals for producing automatic gain control signals that are connected to regulate the gain of the I.-F. amplifier in each channel;

whereby the monitoring means prevent degradation of the combined output signals whenever undesired signals are sensed in one or more channels.

2. The combination as set forth in claim 1 wherein the buffer interrupting means comprises a buffer amplifier for each channel.

3. The combination as set forth in claim 1 in which the monitoring means includes means for sensing a beat frequency in said phase detector and produces said monitor output signals in response to said sensed beat frequency, said monitor output signals controlling the buffer amplifier to interrupt the transmission of faulty reception signals in the channel.

4. In an angle modulation intermediate-frequency combining system in which at least two receiving channels are connected in parallel to an R.-F. source and in which the output signals of said channels are interconnected to provide combined channel output signals, each of said channels including a frequency converter controlled by a local oscillator for converting the R.-F. signals to I.-F. signals, an I.-F. amplifier for amplifying said I.-F. signals, a phase detector for comparing said I.-F. signals with the combined channel output signals and producing detector output signals in response to said comparison that are connected to control the phase of said local oscillator, the improvement comprising: channel signal interrupting means connected into each channel and controlled by an output of the phase detector in the channel associated therewith for preventing the transmission of undesired signals through the channel whereby degradation of the combined channel output signals by undesired signals being generated in one or more channels is prevented.

5. In the system as set forth in claim 4 wherein the channel interrupting means for each channel includes a buffer amplifier connected between the I.-F. amplifier and the phase detector, an output of said phase detector being connected to control said buffer amplifier.

6. In the system as set forth in claim 5 wherein the channel interrupting means for each channel further comprises: monitoring means connected to sense a beat frequency in the phase detector and producing monitor output signals, whenever said beat frequency is sensed, which are connected to control the buffer amplifier to interrupt signal transmission in the channel.

7. In the system as set forth in claim 4 wherein gain control means, responsive to the combined channel output signals, are provided and connected to control the gain of the I.-F. amplifier in each channel.

References Cited by the Examiner

UNITED STATES PATENTS

| | | | |
|---|---|---|---|
| 2,302,951 | 11/42 | Peterson | 325—306 |
| 2,479,548 | 8/49 | Young | 325—151 |
| 2,975,275 | 4/61 | Adams | 325—305 |
| 2,979,613 | 4/61 | Adams et al. | 325—305 |
| 3,048,782 | 8/62 | Altman | 325—305 |

FOREIGN PATENTS

| | | |
|---|---|---|
| 230,517 | 11/58 | Australia. |

DAVID G. REDINBAUGH, *Primary Examiner.*

SAMUEL B. PRITCHARD, *Examiner.*